(12) United States Patent
Wang et al.

(10) Patent No.: US 12,279,110 B2
(45) Date of Patent: Apr. 15, 2025

(54) PROTOCOL DATA UNIT (PDU) SESSION ESTABLISHMENT

(71) Applicant: InterDigital Patent Holdings, Inc., Wilmington, DE (US)

(72) Inventors: Guanzhou Wang, Brossard (CA); Samir Ferdi, Kirkland (CA); Ulises Olvera-Hernandez, Montreal (CA); Michelle Perras, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 160 days.

(21) Appl. No.: 17/766,097

(22) PCT Filed: Oct. 1, 2020

(86) PCT No.: PCT/US2020/053858
§ 371 (c)(1),
(2) Date: Apr. 1, 2022

(87) PCT Pub. No.: WO2021/133451
PCT Pub. Date: Jul. 1, 2021

(65) Prior Publication Data
US 2022/0377545 A1    Nov. 24, 2022

Related U.S. Application Data

(60) Provisional application No. 62/910,151, filed on Oct. 3, 2019.

(51) Int. Cl.
*H04W 12/06*    (2021.01)
*G08G 5/55*     (2025.01)
(Continued)

(52) U.S. Cl.
CPC .............. *H04W 12/06* (2013.01); *G08G 5/55* (2025.01); *G08G 5/56* (2025.01); *G08G 5/57* (2025.01);
(Continued)

(58) Field of Classification Search
CPC ...... H04W 8/082; H04W 80/10; H04W 40/02
See application file for complete search history.

(56) References Cited

U.S. PATENT DOCUMENTS 8,855,071 B1 * 10/2014 Sankaran .............. H04W 76/11
370/349
10,034,209 B1 * 7/2018 Nandan ............. H04W 36/0061
(Continued)

FOREIGN PATENT DOCUMENTS

| CN | 1947401 A | 4/2007 |
|---|---|---|
| CN | 109673174 A | 4/2019 |

(Continued)

OTHER PUBLICATIONS

3rd Generation Partnership Project (3GPP), S2-180062, "Updates to PDU Session Establishment/Modification Procedure", Nokia, Nokia Shanghai Bell, SA WG2 Meeting #125, Gothenburg, Sweden, Jan. 22-26, 2018, 21 pages.

(Continued)

*Primary Examiner* — Barbara B Anyan
(74) *Attorney, Agent, or Firm* — CONDO ROCCIA KOPTIW LLP

(57) ABSTRACT

Systems, methods, and instrumentalities are disclosed that are associated with cellular communications for unmanned aerial vehicles and associated devices. A WTRU may initiate multiple PDU sessions. The WTRU may initiate a first protocol data unit (PDU) session. The WTRU may receive one or more session parameters for a second PDU session. The one or more session parameters for the second PDU (Continued)

session may be received via the first PDU session. The WTRU may initiate the second PDU session using the one or more session parameters (e.g., based on an authentication and authorization associated with the first PDU session being successful). The WTRU may send or receive an operation communication via the second PDU session. The operation communication may comprise an unmanned aerial vehicle command and control message or an unmanned aerial vehicle payload message.

12 Claims, 9 Drawing Sheets

(51) Int. Cl.
| | |
|---|---|
| *G08G 5/56* | (2025.01) |
| *G08G 5/57* | (2025.01) |
| *H04W 12/0471* | (2021.01) |
| *H04W 40/02* | (2009.01) |
| *H04W 48/18* | (2009.01) |
| *H04W 80/10* | (2009.01) |
| *H04W 84/06* | (2009.01) |

(52) U.S. Cl.
CPC ....... *H04W 12/0471* (2021.01); *H04W 40/02* (2013.01); *H04W 48/18* (2013.01); *H04W 80/10* (2013.01); *H04W 84/06* (2013.01)

(56) References Cited

U.S. PATENT DOCUMENTS

| | | | |
|---|---|---|---|
| 2005/0201357 A1 | 9/2005 | Poyhonen | |
| 2013/0007237 A1* | 1/2013 | Mehta | H04W 8/082 709/223 |
| 2014/0321328 A1 | 10/2014 | Zuniga et al. | |
| 2017/0012697 A1* | 1/2017 | Gong | H04B 7/18506 |
| 2018/0019802 A1* | 1/2018 | Teague | H04L 41/5022 |
| 2019/0116631 A1* | 4/2019 | Talebi Fard | H04W 80/10 |
| 2019/0150219 A1 | 5/2019 | Wang et al. | |
| 2020/0084663 A1* | 3/2020 | Park | H04W 8/08 |
| 2021/0329460 A1* | 10/2021 | Liao | H04W 12/37 |

FOREIGN PATENT DOCUMENTS

| | | |
|---|---|---|
| WO | 2019/160737 A1 | 8/2019 |
| WO | 2019/169260 A1 | 9/2019 |
| WO | 2021133451 A2 | 7/2021 |

OTHER PUBLICATIONS

3rd Generation Partnership Project (3GPP), S2-180671, "Rejection of PDU Session Establishment when Authentication or Authorization Fails", Huawei, HiSilicon, 3GPP TSG-SA2 Meeting #125, Gothenburg, Sweden, Jan. 22-26, 2018, 9 pages.

3rd Generation Partnership Project (3GPP), SP-181114, "Study on Supporting Unmanned Aerial Systems Connectivity, Identification, and Tracking", SA WG2, TSG SA Meeting #SP-82, Sorrento, Italy, Dec. 12-14, 2018, 3 pages.

3rd Generation Partnership Project (3GPP), TR 22.825 V16.0.0, "Technical Specification Group Services and System Aspects, Remote Identification of Unmanned Aerial Systems, Stage 1 (Release 16)", Sep. 2018, pp. 1-22.

3rd Generation Partnership Project (3GPP), TS 22.125 V16.1.0, "Technical Specification Group Services and System Aspects, Unmanned Aerial System (UAS) Support in 3GPP, Stage 1, Release 16", Mar. 2019, pp. 1-9.

3rd Generation Partnership Project (3GPP), TS 23.501 V16.1.0, "Technical Specification Group Services and System Aspects, System Architecture for the 5G System, Stage 2 (Release 16)", Jun. 2019, pp. 1-368.

3rd Generation Partnership Project (3GPP), TS 23.502 V15.5.1, "Technical Specification Group Services and System Aspects, Procedures for the 5G System, Stage 2 (Release 15)", Apr. 2019, 354 pages.

3rd Generation Partnership Project (3GPP), Ts 23.502 V16.1.1, "Technical Specification Group Services and System Aspects, Procedures for the 5G System, Stage 2 (Release 16)", Jun. 2019, pp. 1-495.

3rd Generation Partnership Project (3GPP), TS 23.503 V16.1.0, "Technical Specification Group Services and System Aspects, Policy and Charging Control Framework for the 5G System, Stage 2 (Release 16)", Jun. 2019, pp. 1-99.

3rd Generation Partnership Project (3GPP), TS 24.501 V16.0.2, "Non-Access-Stratum (NAS) Protocol for 5G System (5GS), Stage 3", Mar. 2019, pp. 1-480.

ATIS, "Support for UAV Communications in 3GPP Cellular Standards", ATIS-I-0000069, Oct. 2018, 15 pages.

ATIS, "Unmanned Aerial Vehicle (UAV) Utilization of Cellular Services—Enabling Scalable and Safe Operation", ATIS-I-0000060, 2017, 32 pages.

TS 23.502 V16.2.0, , "3rd Generation Partnership Project (3GPP)", Technical Specification Group Services and System Aspects, Procedures for the 5G System (5GS), Stage 2, (Release 16), Sep. 2019, 525 pages.

GSMA, "Insights into supporting Unmanned Aircraft on Mobile Networks", GSM Association, 2022, 36 pages.

* cited by examiner

PROTOCOL DATA UNIT (PDU) SESSION ESTABLISHMENT

CROSS-REFERENCE TO RELATED APPLICATIONS

This application is the National Stage Entry under 35 U.S.C. § 371 of Patent Cooperation Treaty Application No. PCT/US2020/053858, filed Oct. 1, 2020, which claims the benefit of U.S. Provisional Application No. 62/910,151, filed Oct. 3, 2019, the contents of which are incorporated by reference herein in their entirety.

BACKGROUND

Unmanned aerial systems (UASs) or unmanned aerial vehicles (UAVs) will use various communication methods to support their operation. For example, UASs/UAVs may be connected to a cellular network. The number of UAVs in operation have been growing in recent years and the applications enabled by UAVs are expanding into a wide variety of industries. UASs today may rely on direct point to point communication (e.g. via the unlicensed ISM band), which may limit the range of operation. Point to point communication may be unreliable, unsecure, and/or of low data rates.

SUMMARY

Systems, methods, and instrumentalities are disclosed that are associated with cellular communications for unmanned aerial vehicles and associated devices. A WTRU may initiate multiple PDU sessions. A WTRU may register with a network (e.g., the WTRU may register with the network via a network entity or function, such as an access mobility function). The WTRU may initiate a first protocol data unit (PDU) session. The first PDU session may be associated with an authentication and/or authorization of the WTRU, for example by an (e.g., third party) authentication and authorization server (e.g., a UAS Service Supplier, UAV Traffic Management function). The first PDU session may be limited or initially limited (e.g., to authentication and/or authorization, non-operation communications, etc.). The WTRU may receive one or more session parameters for a second PDU session. The one or more session parameters for the second PDU session may be received via the first PDU session. The one or more session parameters may comprise a data network name, a single network slice selection assistance information, and/or a service and session continuity mode. The WTRU may initiate the second PDU session using the one or more session parameters (e.g., based on the authentication and authorization being successful). The WTRU may send or receive an operation communication via the second PDU session. The operation communication may comprise an unmanned aerial vehicle command and control (also may be referred to as C2 or C&C) message or an unmanned aerial vehicle payload message. The WTRU may modify the first PDU session, e.g., based on the authentication and authorization being successful). The modification may include allowing one or more operation communications to be sent or received via the first PDU session (e.g., where in examples the first PDU session did not allow the operation communications before initiation/establishment of the second PDU session).

The terms unmanned aerial vehicles (UAVs), UAV controllers (UAV-Cs), drones, and/or WTRUs may be used interchangeably herein. Although some examples may be described using one of the terms WTRUs, UAVs, UAV-Cs, or drones, the examples may be applicable to WTRUs, UAVs, UAV-Cs, and/or drones as appropriate. In examples, an unmanned aerial system (UAS) may refer to a combination of a UAV(s) and C-UAV(s).

DETAILED DESCRIPTION

Figure 1A:
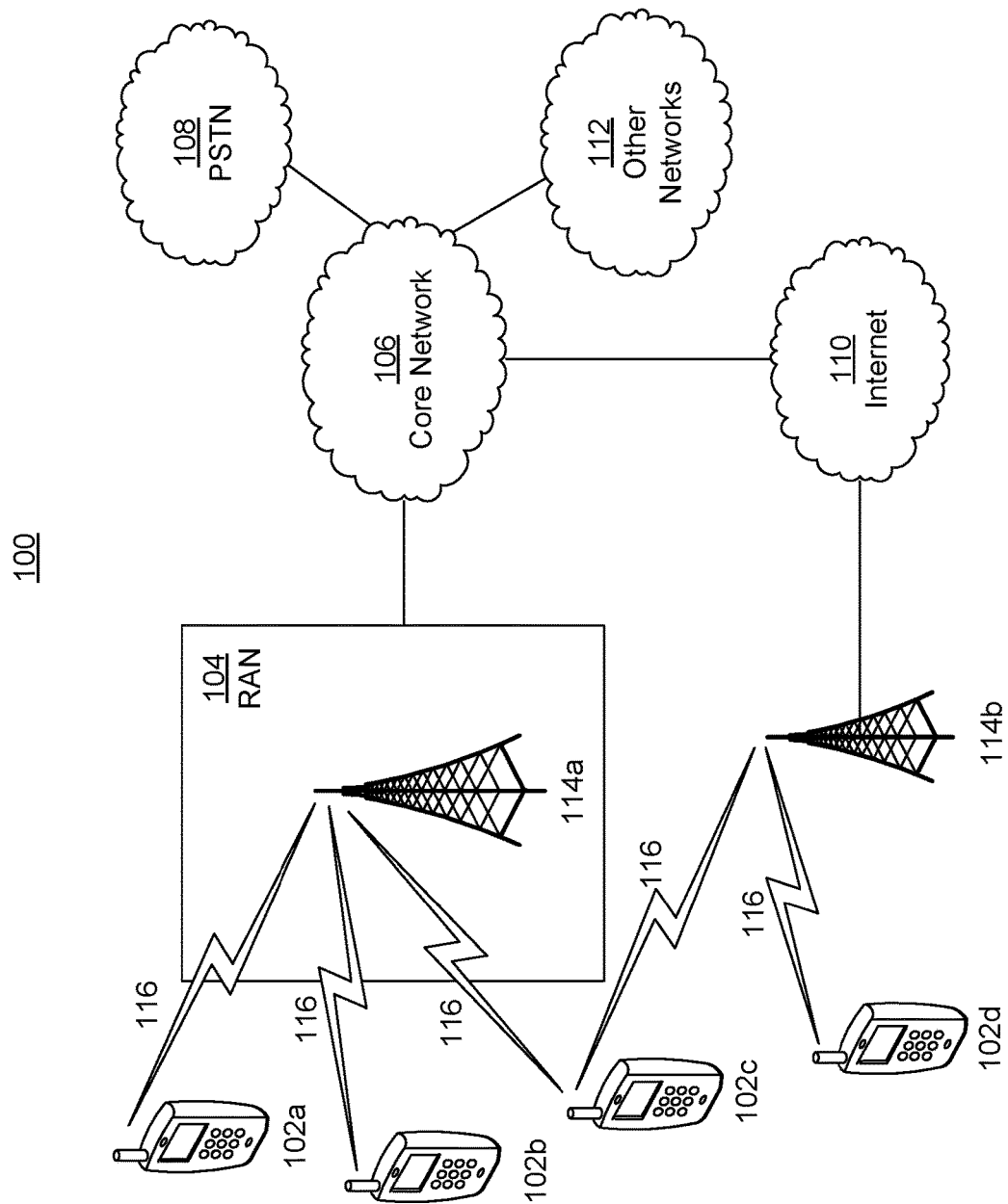
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
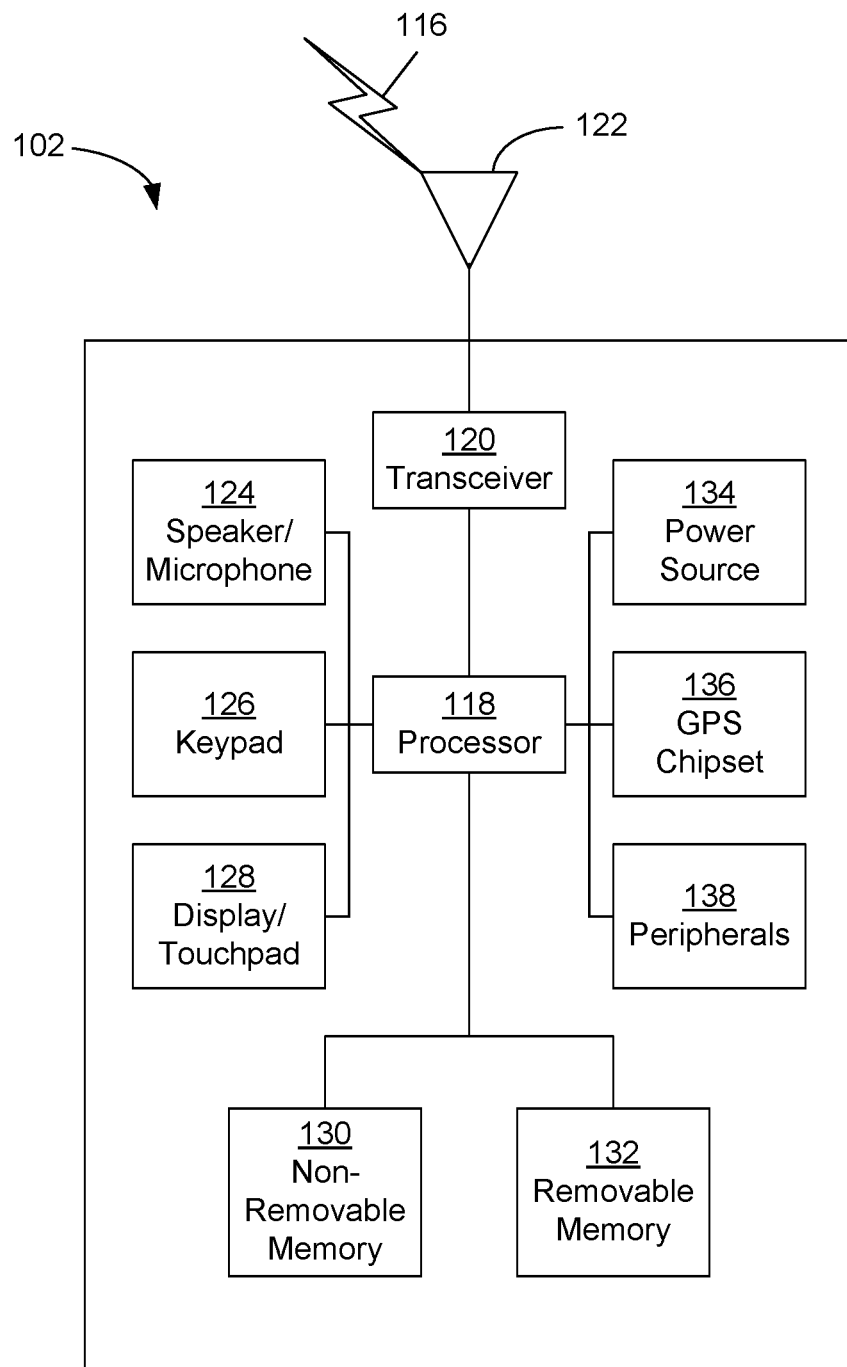
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
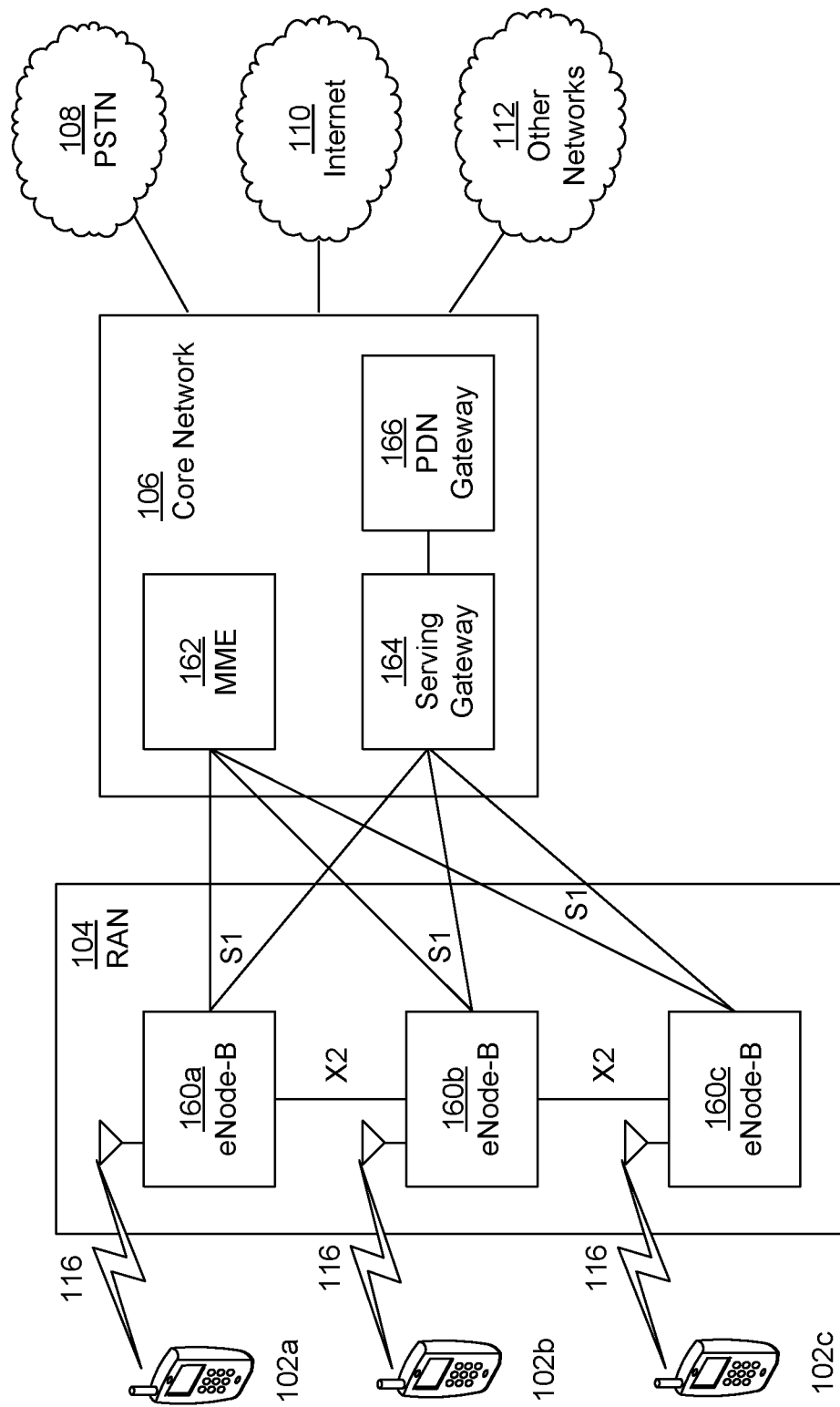
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
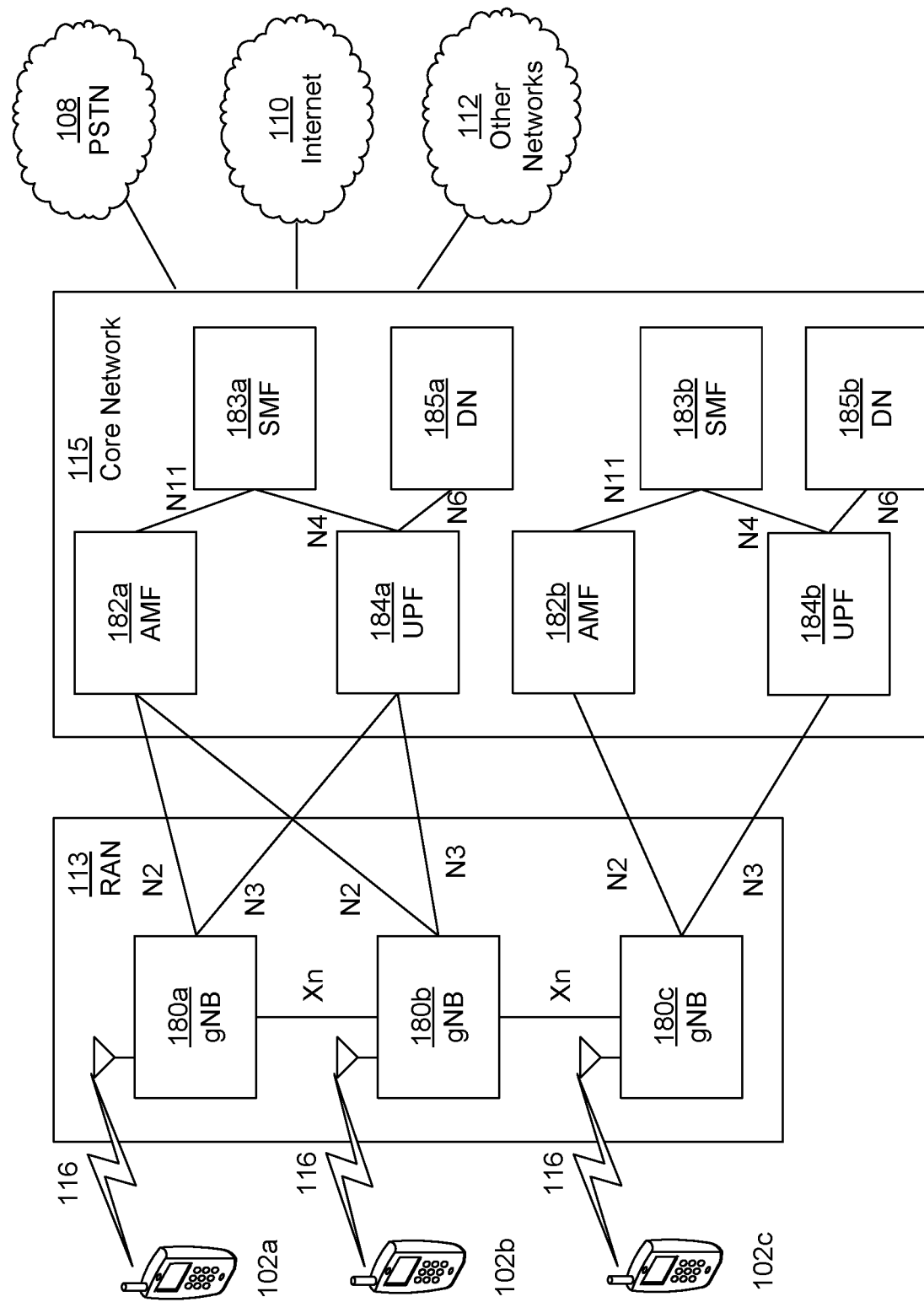
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are disclosed that are associated with cellular communications for unmanned aerial vehicles and associated devices. A WTRU may initiate multiple PDU sessions. A WTRU may register with a network (e.g., the WTRU may register with the network via a network entity or function, such as an access mobility function). The WTRU may initiate a first protocol data unit (PDU) session. The first PDU session may be associated with an authentication and/or authorization of the WTRU, for example by an (e.g., third party) authentication and authorization server (e.g., a UAS Service Supplier, UAV Traffic Management function). The first PDU session may be limited or initially limited (e.g., to authentication and/or authorization, non-operation communications, etc.). The WTRU may receive one or more session parameters for a second PDU session. The one or more session parameters for the second PDU session may be received via the first PDU session. The one or more session parameters may comprise a data network name, a single network slice selection assistance information, and/or a service and session continuity mode. The WTRU may initiate the second PDU session using the one or more session parameters (e.g., based on the authentication and authorization being successful). The WTRU may send or receive an operation communication via the second PDU session. The operation communication may comprise an unmanned aerial vehicle command and control (also may be referred to as C2 or C&C) message or an unmanned aerial vehicle payload message. The WTRU may modify the first PDU session, e.g., based on the authentication and authorization being successful). The modification may include allowing one or more operation communications to be sent or received via the first PDU session (e.g., where in examples the first PDU session did not allow the operation communications before initiation/establishment of the second PDU session).

The terms unmanned aerial vehicles (UAVs), UAV controllers (UAV-Cs), drones, and/or WTRUs may be used interchangeably herein. Although some examples may be described using one of the terms WTRUs, UAVs, UAV-Cs, or drones, the examples may be applicable to WTRUs, UAVs, UAV-Cs, and/or drones as appropriate. In examples, an unmanned aerial system (UAS) may refer to a combination of a UAV(s) and C-UAV(s).

A WTRU may receive mission specific configuration information (e.g. from a UAS Traffic Management (UTM) node or function) and may use the configuration to select wireless communication parameters such as packet data unit (PDU) session parameters. The term UAS Service Supplier (USS) may be used interchangeably with UTM herein.

A WTRU and 3GPP network may receive mission specific quality of service (QoS) requirements (e.g. from the UTM) and may use the QoS requirements to select appropriate QoS parameters for one or PDU sessions (e.g. in QoS provisioning). A UTM may provide command and control message—Differentiated Services Code Point/Traffic Class (DSCP/TC) mapping configuration. The "command and control message—DSCP/TC" mapping configuration may be used by the network and/or WTRU to be able to differentiate command and control messages for QoS treatment.

A WTRU (e.g., UAV-C) may set up a PDU session. For example, the PDU session may be set up for command and control communications with a peer WTRU, where in one example the peer WTRU may be a UAV. The WTRU may provide an indication that a PDU session is for command and control traffic. The WTRU may provide an indication that the PDU session is linked to a peer WTRU PDU session. The WTRU may provide the 3GPP identifier of the peer WTRU. The WTRU may provide a PDU session ID (e.g. for command and control traffic for peer WTRU) during PDU session modification (e.g. establishment).

A WTRU may receive UAV mission specific (e.g., site survey, package delivery, etc.) configuration information (e.g. from a UTM) and may use the configuration (e.g. for selecting PDU session parameter(s)).

A WTRU and 3GPP network may receive mission specific QoS requirements (e.g. from the UTM) and may incorporate them (e.g. in QoS provisioning). A UTM may provide a "command and control message—DSCP/TC" mapping configuration (e.g. for the network and WTRU to be able to differentiate command and control messages for QoS treatment).

A WTRU (e.g., UAV, UAV-C, and/or drone) may set up a PDU session (e.g. for command and control communications with a peer WTRU). The WTRU may provide an indication that a PDU session is for command and control traffic. The WTRU may provide an indication that the PDU session is linked to a peer WTRU PDU session. The WTRU may provide the identifier (e.g., the 3GPP identifier) of the peer WTRU. The WTRU may provide a PDU session ID (e.g. for command and control traffic for peer WTRU) during PDU session modification (e.g. PDU session establishment).

A WTRU may be connected to a cellular network. The number of UAVs in operation has been growing in recent years and the numbers and types of applications enabled by UAVs may be expanding into a wide variety of industries. A UAS today may rely on direct point to point communication (e.g. via the unlicensed ISM band), which may limit the range of operation. The point to point communication may be unreliable, unsecure, and/or of low data rates. Advanced cellular technologies such as LTE and 5G may be utilized (e.g. to enable beyond visible line of sight (BVLOS) operation).

Use of cellular networks for communications may offer capabilities beyond what is provided by direct point to point communication. For example, as a result of using cellular networks UAVs/WTRUs may be able to operate at a greater operation range (e.g. that may be provided by mobile network coverage and beyond). A result of using cellular networks may be relatively higher bandwidth. A result of using cellular networks may be enabling of relatively low latency. A result of using cellular networks may be that the network can attempt to provide QoS guarantees for communications. A result of using modern cellular networks (e.g. the 5G network) may be improved performance of UAV applications. A result of using cellular networks may be advanced security mechanisms (e.g. to address security concerns involved in managing UAV applications). Use of cellular networks may allow greater operation range, high bandwidth, low latency, guaranteed QoS, advanced communication capabilities, improved performance of UAV applications, advanced security mechanisms and/or the like.

Figure 2:
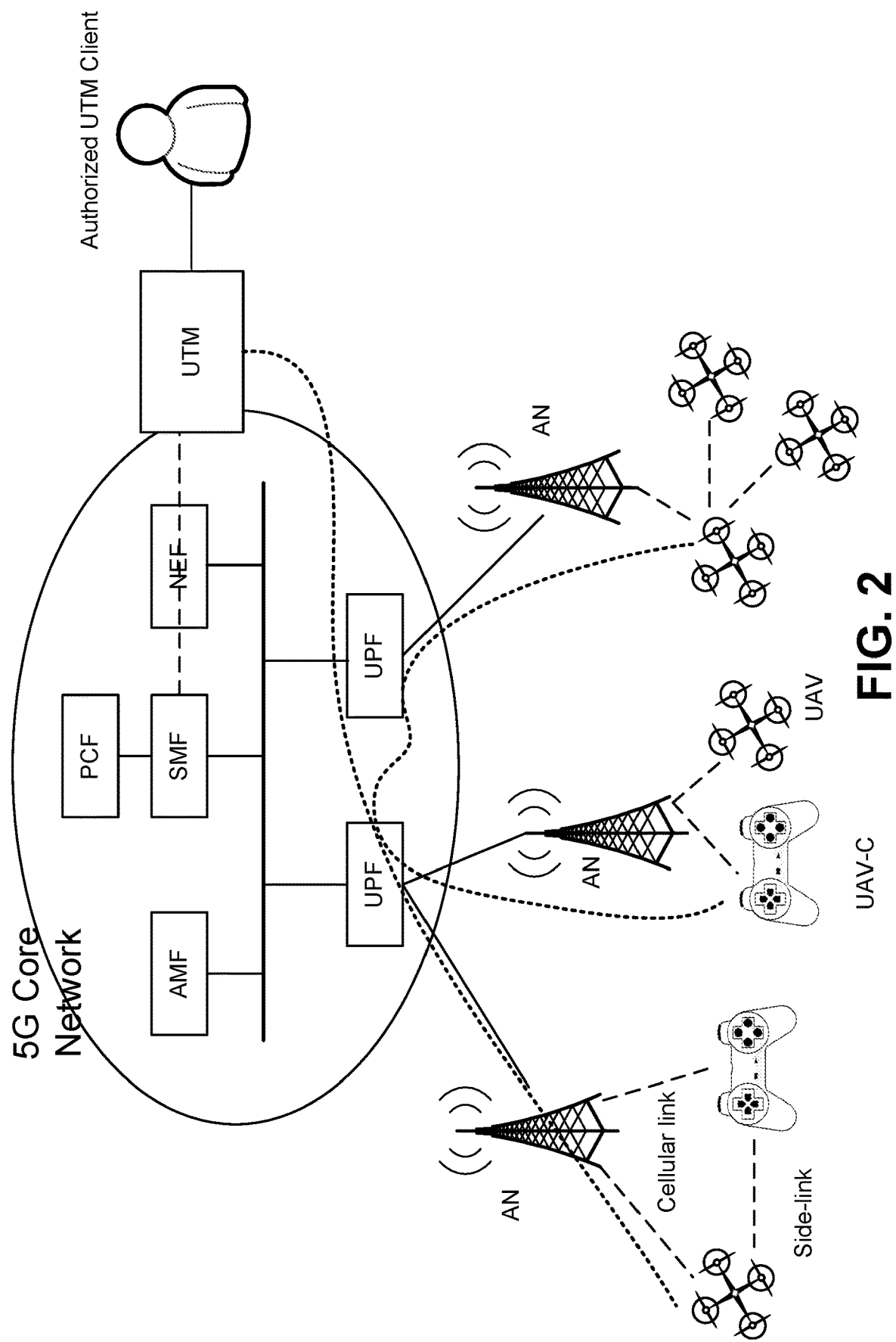
FIG. 2 is a system diagram illustrating an example system architecture for supporting WTRUs that may be used in a 5G network according to an embodiment.

FIG. 2 illustrates an example system architecture for supporting WTRUs that may be used in a 5G network. The UTM may be a framework (e.g. for UAS traffic management). The roles and responsibilities of UTMs and the procedures and protocols applied in UTMs may vary. The UTM may be a set of functions (e.g. for authenticating UAV, authorizing UAS services, managing UAS policies, and/or controlling UAV traffic in the airspace). The authorized users may query the identity and/or metadata of a WTRU and/or its controller (e.g. via the UTM). The UTM may store operation data (e.g. data used for the UAS to operate). An air traffic control agency may use the UTM server (e.g. to authorize, enforce and/or regulate UAS operation).

In an architecture as in FIG. 2, the WTRUs (e.g., UAVs, UAV-Cs, and/or drones) may communicate with the UTM (e.g. via the network User plane) (e.g. for identification, authentication procedures, authorization procedures, command and control message exchanges, and/or command and control data exchanges). The 3GPP network functions (e.g. SMF, PCF) may have direct or indirect (e.g. via NEF) control interfaces with the UTM.

A cellular-network-connected WTRU may involve various types of cellular communication (e.g. for carrying out its missions). The cellular communication may be between the UAS and UTM, may be non-payload communication (e.g. command and control), and/or the cellular communication may be payload communication (e.g. real-time video or sensor data).

There may be communication between the UAS and UTM. The communication between the UAS and UTM may be enabled for identification, authorization, command and control, and/or law enforcement activities. A User plane connection may be used between WTRUs and the UTM. Control plane communication may be used between WTRUs and the UTM.

Cellular communication may be non-payload communication (e.g. command and control). Command and control message and data exchange may be used for UAV missions and/or security. In examples, command and control exchanges (e.g. location and/or flight data reporting) may take place between WTRU(s) and the UTM, and/or between WTRUs (e.g. between UAV(s) and/or UAV-C(s)).

Command and control communication types may include telemetry report(s) from the WTRU. A telemetry report may be sent from a WTRU to a controller or the network. A telemetry report may include UAV altitude and/or velocity information. Command and control communication types may include real-time remote flight control command (e.g. for non-autonomous UAVs). Command and control communication types may include mission information. Command and control communication types may include flight plan information. Command and control communication types may include constraints. Command and control communication types may include regulatory data updates. Command and control communication types may include collision avoidance assistance information. Command and control communication types may include one or more of telemetry reports, altitude and/or velocity, real-time remote flight control command, mission, flight plan, constraints, regulatory data updates, collision avoidance assistance information, and/or the like.

A command and control message may have a small size. A command and control message may be sent using a low data rate. Command and control message types may have different QoS requirements (e.g. latency, data loss rate, and/or the like). In examples, pilot commands may need to be real-time, while a mission update may tolerate a certain delay.

A WTRU may send payload communication(s). A WTRU, e.g., in mission, may send payload data, such as real-time video or sensor data, (e.g. to its UAV-C, an application server, and/or storage in the network). In examples, there may be more payload communication(s) in the uplink than the downlink. In examples, there may be less payload communication(s) in the uplink than the downlink.

Figure 3:
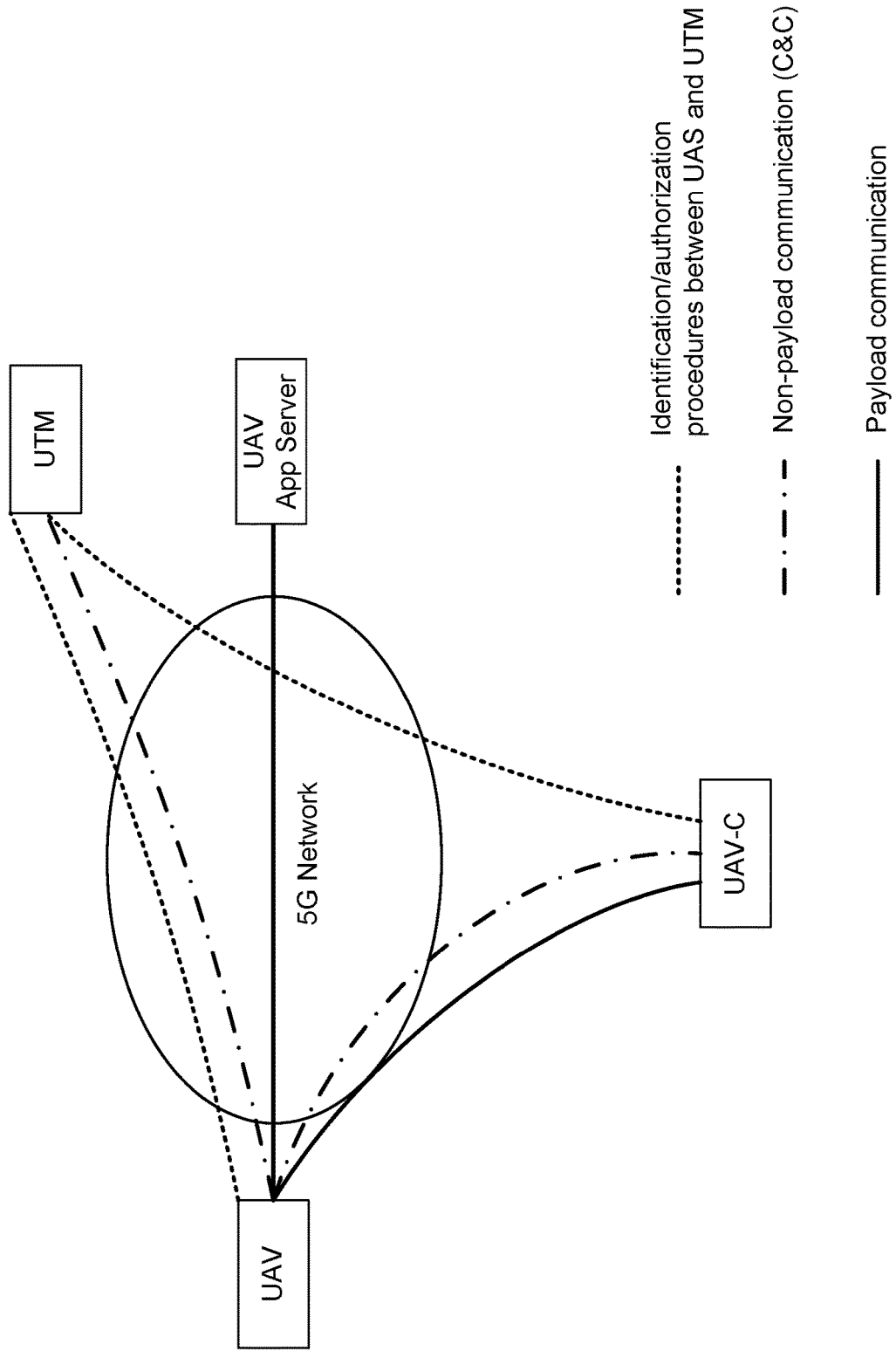
FIG. 3 is a diagram illustrating examples of UAV communication which may be enabled by cellular network.

FIG. 3 is a diagram illustrating examples of UAV communication, which may be enabled by a cellular network.

A UAS may set up cellular connections for UAS communication. User plane connections may be established in the cellular network (e.g. to enable cellular communication for the UAS).

The characteristics of UAV missions (e.g., UAV flights) may pose challenges. Challenges of UAV missions may include identification and authorization of the UAV and/or the UAV-C (e.g. to establish PDU sessions) and/or QoS requirements for UAV communication.

PDU session establishment may be initiated by a WTRU. A WTRU may initiate PDU session establishment (e.g. in a cellular network), for example, if the WTRU has successfully registered with the network. A UAV and/or a UAV-C may need to be identified and authorized (e.g. by the UTM), e.g., prior to establishment of PDU session(s) for communication. The identification and authorization between the UAV and/or UAV-C and a network entity (e.g., UTM), which may be carried out via the user plane for example, may involve PDU session connections. A UAV may be allowed to establish PDU session connections, e.g., after the UAV's controlling UAV-C is connected to the network. There may be a dependency between various PDU sessions for different purposes and/or a dependency between UAV and/or UAV-C connections. Implementations are disclosed so that a WTRU and a network may establish one or more PDU connectivity service(s) that are provided for a particular WTRU, e.g., based on communication association or dependency with another WTRU, such as in command and control communications within a UAS.

A WTRU and/or network may establish PDU sessions for a UAS, trigger establishment of various PDU sessions, check the dependency (e.g. on authorization results and/or the presence of its controlling peer entity), and/or the like. When establishing PDU sessions for the UAS, a network triggered release of a PDU session used by the UAS in conjunction with another PDU session for command and control communications may be allowed or prevented depending on the circumstance.

When establishing PDU sessions for the UAS, the cellular network may need to be aware of the purpose of the PDU session (e.g. for UAV communication) and/or the role of the UAS (e.g. UAV or UAV-C) (e.g. that owns the PDU sessions). When establishing a PDU session for the UAS, the network may be informed of the purpose of the PDU session (e.g. for UAV communication) and/or the role of the UAS (e.g. UAV or UAV-C) (e.g. that owns the PDU sessions). In establishing a PDU session for the UAS, the attributes (e.g. DNN, S-NSSAI, SSC Mode, and/or the like) may be selected for the PDU session.

The network may manage the inter-dependency of PDU sessions associated with the UAS in compliance with UAS operational requirements.

The QoS requirements (e.g. for UAV communication) may be device and/or mission specific. A UAV-C may have relatively high DL data rate requirements. A UAV may have a high UL data rate requirement. A UAV mission (e.g. which may involve static image transmission) may have lower data rate requirements than a different mission (e.g. one involving HD video streaming). In examples, when the 3GPP network determines the policy control information, the 3GPP network may not possess the QoS requirements (e.g. UAV mission specific data rate requirements). The entity (e.g. UTM) that possesses the QoS requirements may dynamically impact the policy control information made by the network (e.g. PCF). QoS provisioning for UAV communication may provide differentiated QoS treatment (e.g. for various command and control message and/or data types). Command and control messages and/or data exchanged between the UAV and UAV-C or between the UAV and the UTM may have communication types (e.g. UAS-UTM, Command and Control, and/or payload communication). Each type of command and/or data may have its own implication for QoS requirements. A telemetry report (e.g., UAV location, status, and/or the like) may require low data rate and may not be very sensitive to data loss. Flight control commands may require reliable real-time communication.

Filtering the communication types may provide differentiated QoS treatment for these various communication types (e.g. so the network can configure QoS rules using the filters). In examples, QoS rule filters may be based on address information (e.g. IP tuples) and/or application IDs, which the UAV command and control messages may not possess. Filters may re-use the QoS-rule based on 5G QoS mapping. In examples, QoS rules may lack sufficient granularity to enable the differentiation of command and control messages carrying different types of information and/or serving different purposes (e.g., telemetry vs flight control).

The network may guarantee QoS (e.g. for command and control communications) with consideration for the end-to-end communication path (e.g., across the respective PDU sessions used by a UAV and/or UAV-C for command and control communications). Transport of real time flight control commands may be needed (e.g. to avoid safety risks).

The network may enforce consistent QoS treatment of command and control traffic across PDU sessions, e.g., used by a UAS for command and control communications.

A PDU session may be established (e.g. for UAV mission related communication). A cellular-connection capable WTRU may establish a first PDU session, e.g., with the network (e.g. for initial communication between the WTRU and the UTM). The WTRU may authenticate with the UTM and get general authorization from the UTM, and/or the like, for example, before or during PDU session establishment.

A first PDU session may be referred to as default PDU session, initial PDU session, or Authentication and Authorization (AA) PDU session. The initial PDU session may be established during or after (e.g., immediately after) successful registration with the network. The establishment of the initial PDU session may be manually triggered or triggered by a command, e.g., an application layer command, for example a command from a UAV-C via a side-link communication. If the side-link is used, the UAV and the UAV-C may need to be registered as V2X SL communications may be supported for WTRUs in RRC_CONNECTED, RRC_IDLE and (e.g., in NR) RRC_INACTIVE modes.

The UAV or UAV-C may (e.g., if the initial PDU session is ready) communicate with the UTM (e.g. via the initial PDU session) to authenticate and/or get authorization with the UTM. The UAV or UAV-C may (e.g., if the authorization result is successful) initiate a second PDU session for UAV mission related communication(s)/operation communication(s) (e.g. send and/or receive command and control messages and/or payload data) and/or modify the initial PDU session for mission related communication(s)/operation communication(s) (e.g., mission related communication(s)/operation communication(s) may not have been allowed in the initial PDU session, and, the initial PDU session is modified to allow mission related communication(s)/operation communication(s), which may be associated with the initiation of the second PDU session). The UAV or UAV-C may decide to maintain the initial PDU session for command and control communications in parallel with the second PDU session (e.g. for availability and reliability of command and control communications, for example based on a policy) or for Remote identification and tracking (e.g., to transmit location information to USS/UTM). The UAV or UAV-C may receive (e.g. from the UTM or the UAV application server) configuration(s) (e.g. session parameter(s)). The UAV or UAV-C may use the configuration(s) in the establishment of the second PDU session.

The configuration(s) (e.g. session parameter(s)) that may be used in the establishment of the second PDU session may include one or more of: a mission specific data network name (DNN), Single Network Slice Selection Assistance Information (S-NSSAI), and/or Session and Service Continuity (SSC) mode, Service Type, temporary UAV or UAV-C identifiers, identifiers or codes (e.g. for each type of command and control message and/or data), the mappings of command and control message codes (e.g. for mapping command and control message codes to DSCP/TC), and/or time period that the configuration (e.g. session parameter) will remain valid.

The configuration(s) (e.g. session parameter(s)) that may be used in the establishment of the second PDU session may include a mission specific DNN (e.g. that is related to the UAV or UAV-C's current mission). The DNN may be dynamically created (e.g. at the UTM or the application server for each UAS group and/or UAV mission), and the PDU sessions of the same DNN may be identified for the same group or mission. The configurations (e.g. session parameters) that may be used in the establishment of the second PDU session may include S-NSSAI and SSC Mode (e.g. for the future mission-related PDU session). The configurations (e.g. session parameters) that may be used in the establishment of the second PDU Session may include information, such as the Service Type, that may allow the UAV/UAV-C to determine the S-NSSAI or SSC Mode on its own.

The configurations (e.g. session parameters) that may be used in the establishment of the second PDU session may include temporary UAV and/or UAV-C identifiers. The identifier may be a 3GPP assigned identifier such as a Generic Public Subscription Identifier (GPSI) or a UAV application server assigned identifier. The configuration(s) (e.g. session parameter(s)) that may be used in the establishment of the second PDU session may include identifiers or codes (e.g. for each type of command and control messages and/or data). These identifiers or codes may be used by the UAV and/or UAV-C (e.g. to match the QoS rules which use these IDs/Codes as the filters). The configurations (e.g. session parameters) that may be used in the establishment of the second PDU session may include mapping(s) of command and control message code(s) to DSCP/TC. The configurations (e.g. session parameters) that may be used in the establishment of the second PDU session may include the time period that the configuration(s) remain valid.

The UAV and/or UAV-C may receive configuration(s) (e.g. session parameter(s)) that may be used in the establishment of the second PDU session (e.g. via the Control Plane). The UAV and/or UAV-C may receive configuration(s) (e.g. session parameter(s)) that may be used in the establishment of the second PDU session during the registration or the AA. The AMF may retrieve the configuration(s) (e.g. session parameter(s)) for the one or more PDU sessions from the UTM and pass it to the UAV, e.g., in NAS messages.

If a first configuration (e.g., previous configuration, for example previous session parameter) exists in the UAV and/or UAV-C, second configuration(s) (e.g., configuration(s) received after the first configuration) may override the previous configuration. If the time period during which the configuration is valid is specified, the UAV and/or UAV-C may start a timer (e.g. to monitor the validity of the configuration).

Figure 4:
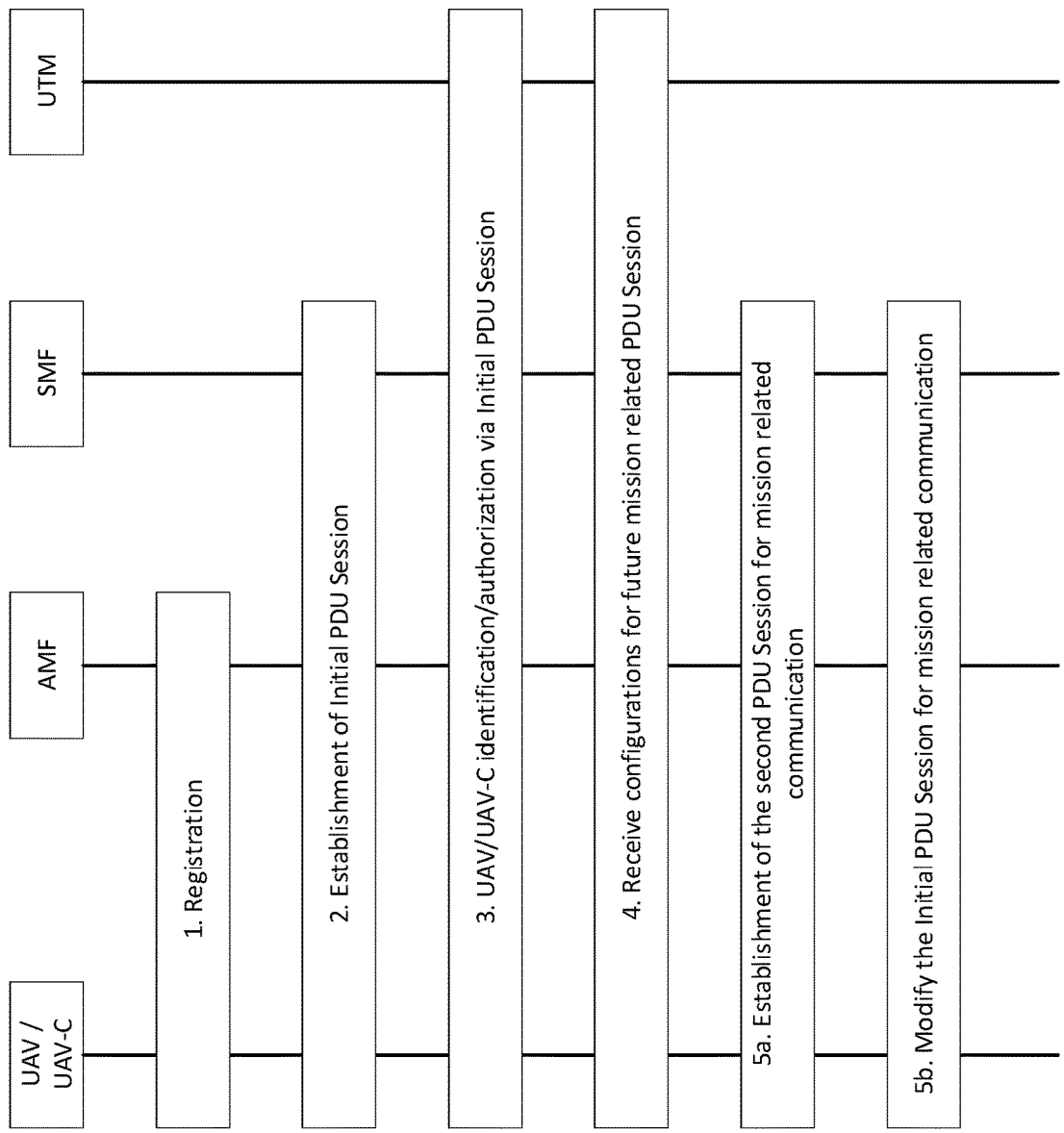
FIG. 4 is an example of initiating/establishing two PDU sessions (e.g. for UAV communication)

FIG. 4 illustrates an example of initiating/establishing two PDU sessions (e.g. for UAV communication). One or more of the illustrated actions may be performed.

A WTRU may initiate the establishment of a second PDU session or modification of an initial PDU session (e.g. if instructed by the UAV-C and/or UTM). The UAV-C may send a connection command, for example via a side-link communication or via an application server (e.g. if the UAV and the UAV-C are registered). Other UTM client(s) or operator(s) may issue the connection command via the UTM to the UAV and/or UAV-C (e.g., via some other connectivity). The UAV and/or UAV-C (e.g., the application in the UAV and/or UAV-C) may instruct the 3GPP modem and/or module to establish a second PDU session and/or modify the existing PDU session for mission related communication(s) (e.g. operation communication(s)).

If the establishment of a second PDU session for mission related communication(s) (e.g. operation communication(s)) is triggered, the UAV or UAV-C may derive the second PDU session parameters (e.g. DNN, S-NSSAI, SSC mode, and/or the like). The UAV or UAV-C may derive the second PDU session parameters (e.g. from the configuration received previously from the UTM, the UE route selection (URSP) rules, and/or pre-configured default parameters).

If the configuration (e.g. session parameter) received from the UTM exists and is valid, the UAV or UAV-C may use the received configuration (e.g. instead of the URSP rules to derive the PDU session parameters). The UAV or UAV-C may use pre-configured default parameters, e.g., if neither the configuration received from the UTM nor the URSP rules are available.

The PDU Session Establishment Request message may include the PDU session parameters. In the PDU Session Establishment Request, the WTRU may include one or more of the following: an indication that this PDU session is used for UAV mission related communication(s) (e.g. operation communication(s)), a Protocol Configuration Option (PCO) that includes information related to the UAV, UAV-C, and/or the current mission (e.g. the temporary identifier it received (e.g., previously received) from the UTM and/or the role of the device), the PDU session ID of the initial PDU session, a 3GPP identity (e.g. MSISDN, GPSI, and/or the like) of the peer UAV or UAV-C, a flag indicating that the PDU session is linked to another PDU session (e.g., used by a peer UAV or UAV-C), and/or the PDU session ID or IDs of a peer UAV or UAV-C.

In the PDU Session Establishment Request, the WTRU may include an indication that this PDU session is used for UAV mission related communication(s) (e.g. operation communication).

In the PDU Session Establishment Request, the WTRU may include a PCO that includes information related to the UAV or UAV-C or the current mission (e.g. the temporary identifier that the UAV previously received from the UTM and/or the role of the device as UAV or UAV-C).

In the PDU Session Establishment Request, the WTRU may include the PDU session ID of the initial PDU session. Including the PDU session ID of the initial PDU session may enable the network to automatically release the initial PDU session if the second PDU session is established or in general maintain a linkage between the two PDU sessions (e.g. where both are used for command and control communication, for example for availability and reliability purposes).

In the PDU Session Establishment Request, the WTRU may include a 3GPP identity (e.g., Mobile Station International Subscriber Directory Number (MSISDN), GPSI, and/or the like) of the peer UAV or UAV-C.

In the PDU Session Establishment Request, the WTRU may include a flag indicating that the PDU session is linked to another PDU session used by a peer UAV or UAV-C.

In the PDU Session Establishment Request, the WTRU may include the PDU session ID or IDs of the peer UAV or UAV-C. The PDU session ID or IDs may be exchanged prior to this PDU session establishment (e.g., using the initial PDU session connectivity, registered by the peer WTRU with UTM and obtained via the UTM).

Linkage of UAV and UAV-C PDU sessions may enable the network to perform PDU session management (e.g. in compliance with UAS operations). An operator policy may take into consideration that paired PDU sessions (e.g., UAV and UAV-C) may be actively used for command and control communications, e.g., in an ongoing flight mission. The MNO may enable the network triggered release of a UAV PDU session or UAV PDU sessions if (e.g., only if) certain pre-defined condition(s) or trigger(s) are satisfied (e.g., UAV-C triggered PDU session release, coinciding with completion of flight mission). The MNO may prevent or avoid the network triggered release of a PDU session that is paired with another PDU session for command and control communications (e.g. to avoid safety risks).

The linkage of peer UAV and UAV-C PDU sessions may enable the network to check and enforce consistency (e.g. with regards to end to end QoS treatment of command and control traffic flows across the UAV and UAV-C PDU sessions). The network may reject a PDU session establishment (e.g. in case the required QoS for the authorized UAS services is not consistent with the QoS requirements of a linked established UAV or UAV-C PDU session or if the network cannot guarantee the end to end required QoS (e.g., real time command and control latency)). Such a condition may occur when UAV and UAV-C are authorized via separate USS/UTMs providing different QoS requirements to the 5GS. The network may modify the PDU session or sessions to align QoS requirements across the linked PDU sessions (e.g. in compliance with QoS information from the UTM, for example authorized UAS services QoS information from UTM).

The UAV-C and/or UAV may request specific QoS handling (e.g. during a PDU session modification procedure). The network may decide (e.g. based on operator policy and/or under UTM control) to refrain from propagating similar QoS handling updates to the linked UAV and/or UAV-C PDU session, to propagate (e.g. automatically) the QoS handling updates to the linked PDU session in a corresponding network requested PDU session modification, and/or to utilize a hybrid approach.

The network may decide (e.g. based on operator policy and/or under UTM control) to refrain from propagating similar QoS handling updates to the linked UAV and/or UAV-C PDU session. For example, such decision(s) may take place during an active flight mission (e.g. to avoid risks to ongoing command and control communications). The network may reject the PDU session modification request (e.g. with an appropriate cause).

The network may decide (e.g. based on operator policy and/or under UTM control) to propagate (e.g. automatically) the QoS handling updates to the linked PDU session in a corresponding network requested PDU session modification (e.g. to ensure consistent QoS treatment across the linked PDU sessions). The network may ensure synchronization of PDU session modification procedures across the linked PDU sessions (e.g., complete PDU session modification requested by UAV-C associated with a PDU session modification command acknowledgement from the UAV).

The network may decide (e.g. based on operator policy and/or under UTM control) to utilize a hybrid approach. QoS flows corresponding to real-time piloting commands may be setup and/or modification may not be authorized for the lifetime of the linked PDU sessions (e.g., any of the linked PDU sessions), for example until flight mission completion, e.g., as described above. Non-real time QoS flow modifications may be propagated.

The SMF that handles the PDU session establishment may include the received UAV communication indication and PCO information when it invokes the PCF service to get the policy control information for the PDU session. The PCF may locate the UTM and may query the UTM (e.g. for the additional QoS requirements). The PCF may perform the query (e.g. via the NEF function) if there is no direct interface between the PCF and the UTM. The QoS requirements provided by the UTM may be mission specific and/or device specific. If the mission involves high-definition video streaming, the UTM may specify high UL date rate requirements for the UAV and high DL data rate requirements for the UAV-C. The PCF may provide the consolidated policy and/or QoS control information to the SMF.

Figure 5:
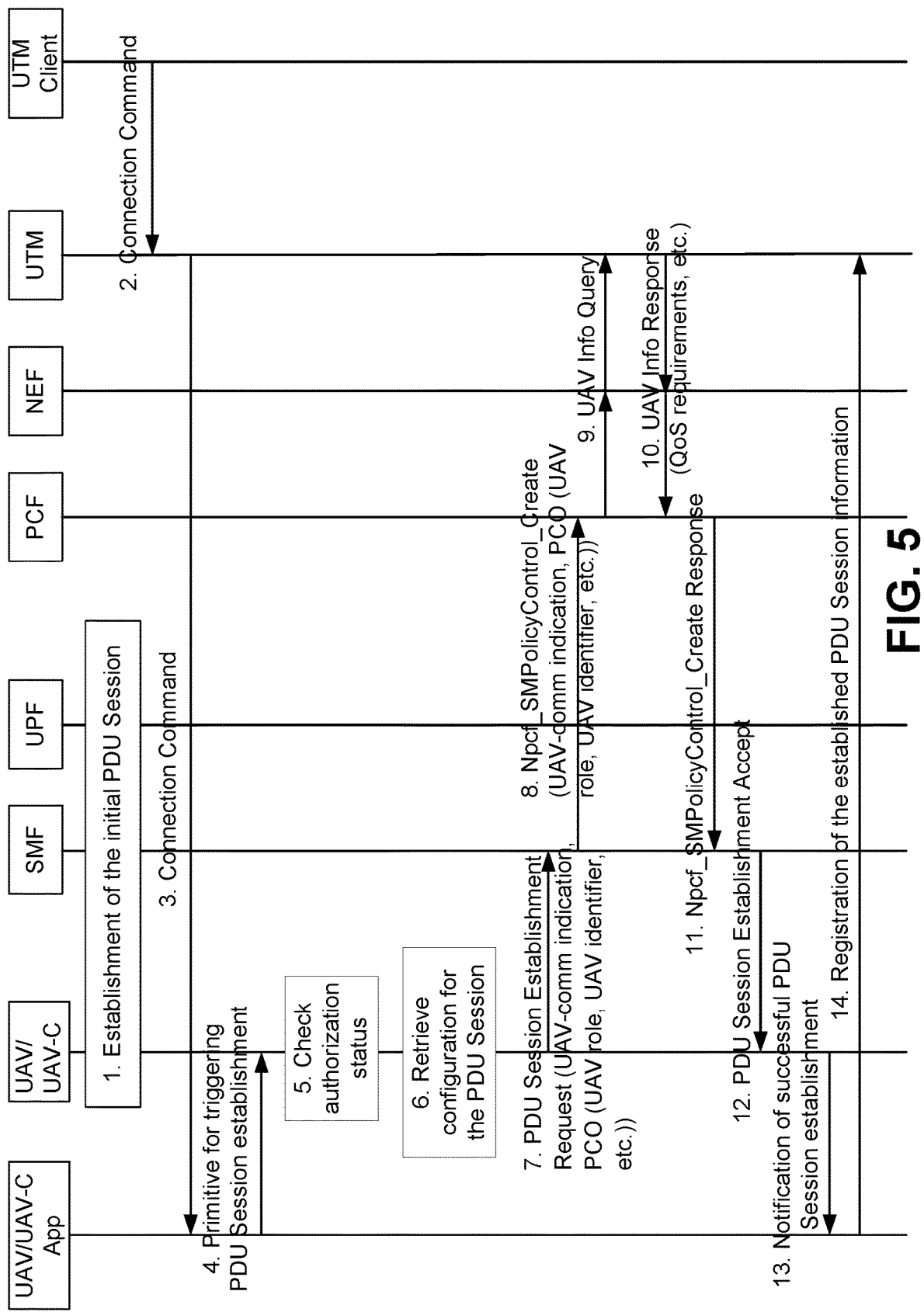
FIG. 5 illustrates an example of initiation/establishment of a PDU session that may be used for mission related communication.

FIG. 5 illustrates initiation/establishment of PDU sessions. FIG. 5 illustrates initiation/establishment of a PDU session that may be used for mission related communication. One or more of the illustrated actions may be performed.

The UAV may establish the initial PDU session. The UAV may use the initial PDU session to perform identification, authentication and/or authorization, and/or retrieve a configuration (e.g., from the UTM) for mission related communication. The UTM client (e.g. UAV-C or other UAV operator) may send a connection command (e.g. through the UTM or UAV application server to the application software running in the UAV). The application software in the UAV may instruct the 3GPP module to establish a PDU session (e.g. for UAV communication). The UAV may check the stored authorization status. If the status indicates that the device has been authorized for UAV communication using the network, the UAV may continue.

The UAV may retrieve the necessary information from the stored configuration which was received from the UTM (e.g. to prepare for the PDU session establishment). The configuration information may include the specific PDU session parameter(s) (e.g. DNN, S-NSSAI, SSC mode, and/or the like), and/or the parameters specific to the UAV device and mission (e.g. the temporary identifiers for the device or the mission). If there is no such received configuration, the UAV may use URSP rules or pre-configuration.

The UAV may initiate the PDU session establishment request using the parameter(s) acquired from the UTM. The UAV may indicate that the PDU session is for UAV communication. The UAV device or mission specific parameter(s) may be included in a PCO and sent with the PDU session establishment request. The SMF that handles the PDU session establishment may invoke the PCF service to establish the policy association with the PCF. The SMF may pass to the PCF the UAV communication indication and UAV specific parameter(s) received in the PDU establishment request.

The PCF may locate the UTM using the UAV identifiers and query the UTM about the specific QoS requirement related to the device and/or the mission. If the PCF doesn't have direct interface with the UTM, the PCF may perform such queries via the NEF. The UTM may respond to the PCF with the UAV device and/or mission specific QoS control information. The PCF may provide the SMF with consolidated policy information (e.g. PCC rules) and may combine policy decisions (e.g. based on subscriber information and/or the requirements from the UTM). The SMF may construct the QoS rules and may send the QoS rules to the UAV in the PDU session accept message (e.g. based on the received policy information). The UAV may inform the UAV application software that the PDU session has been successfully established. The UAV application may register the PDU session details (e.g. IP address allocated for the PDU session, SSC mode, and/or the like) with the UTM and/or application server.

The UTM may provide device and mission specific QoS requirements to the network function (e.g. PCF). The UTM may provide QoS requirements (e.g. for each command and control message and/or data type).

The UTM may identify each type of command and control message and/or data (e.g. with an identifier or a code) and may associate the corresponding QoS requirements with it. The flight control commands may be identified (e.g. as command and control-FC), and the UAV status report messages may be identified (e.g. as command and control-SR). Several types of command and control messages may share the same code (e.g. if their QoS requirements are similar). The UTM may provide a corresponding IP DSCP/TC (e.g. standard or proprietary codes), or other codes that can differentiate traffic classes or priorities in IP packets (e.g. for each command and control message code). The mapping between command and control codes and DSCP/TC codes may be provided to the UAV and/or UAV-C (e.g. as part of the configuration). The received mapping at the UAV or UAV-C may be passed to the application layer (e.g. so the application layer may use the mapping to derive the DSCP/TC and mark the UL command and control packets accordingly).

The PCF may use the UTM provided information (e.g. to form the PCC rules for command and control messages). The PCF may use the combination of the IP tuples and the DSCP/TC which may correspond to various command and control message types as the service data flow filter and may associate the QoS policy control information with the filters.

The SMF may use the same service data flow filters for the packet filters in the QoS rules (e.g. to be used by the WTRU for UL traffic) and the packet filters in the PDR (e.g. to be used by the UPF for the DL traffic) (e.g. when the SMF receives the PCC rules for the PDU session and binds the PCC rule to the QoS flows).

Figure 6:
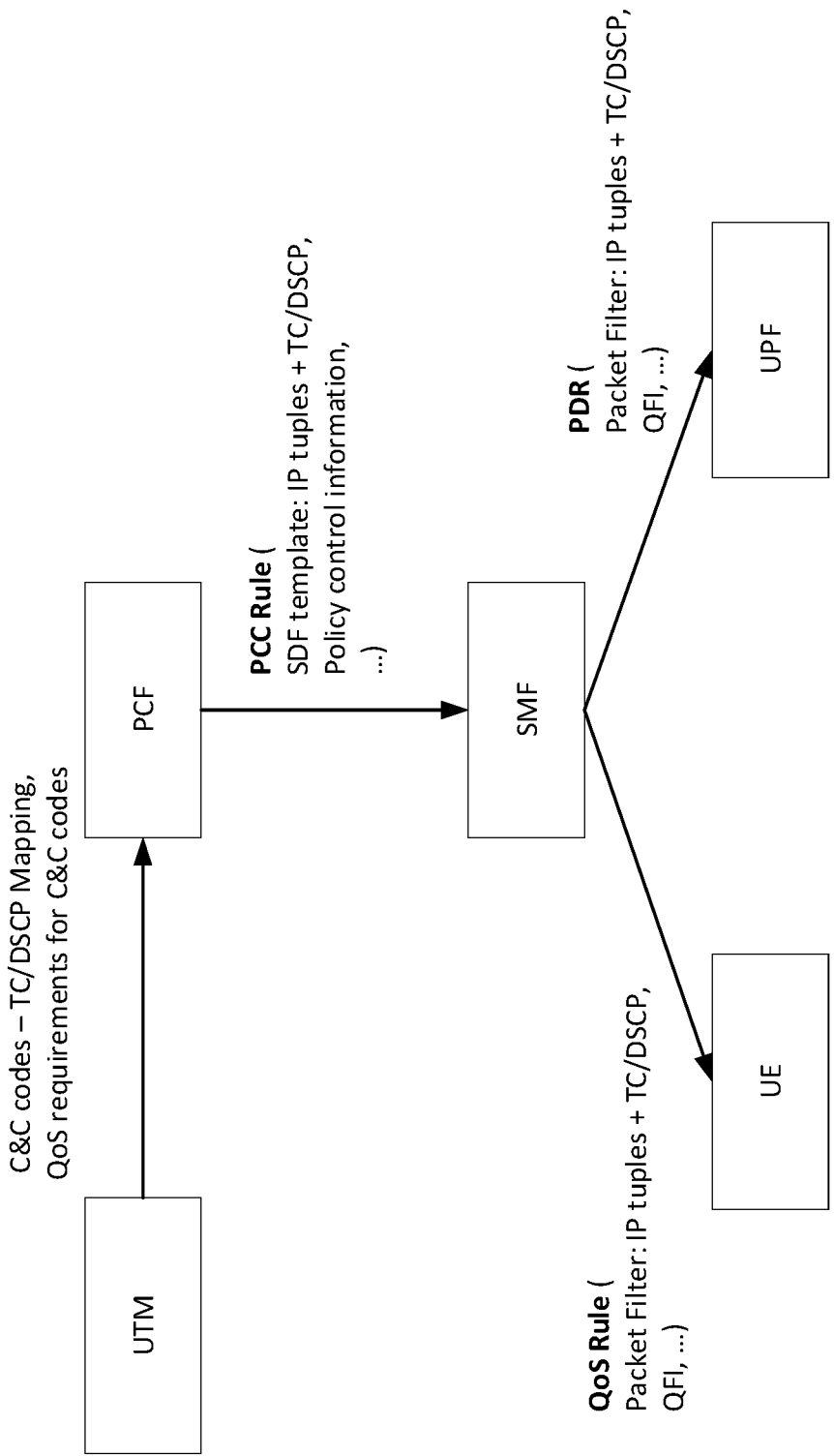
FIG. 6 illustrates an example of WTRU QoS rule provisioning.

FIG. 6 illustrates an example of WTRU QoS rule provisioning. The application layer may have already used the command and control message code—DSCP/TC mapping configuration to derive the DSCP/TC and marked the packets (e.g. when the UAV or UAV-C needs to send a command and control message packet). The UAV or UAV-C may use the received QoS rules, which has the DSCP/TC as part of the packet filters (e.g. to match the packets and determine the QFI for the packets). The application layer may not directly mark the packets with the DSCP/TC, but may indicate the command and control message codes or identifiers to the 3GPP module which may use the received command and control message code—DSCP/TC mapping configuration to mark the packets, e.g., in associated with or before applying the QoS rules.

What is claimed:

1. A wireless transmit/receive unit (WTRU), comprising:
a processor configured to:
send, to a network node, a first message, wherein the first message indicates a request to initiate a first protocol data unit (PDU) session associated with an authentication and authorization of the WTRU;
receive, from the network node, a second message, wherein the second message indicates an unmanned aerial vehicle (UAV) ID;
send, to the network node, a third message based on the authentication and authorization being successful, wherein the third message indicates a request, using the UAV ID, to initiate a second PDU session for command and control (C2) communications, and wherein the third message includes an authorization payload for the C2 communications; and receive, from the network node, a fourth message, where the fourth message is a PDU session accept message.

2. The WTRU of claim 1, wherein the processor is further configured to modify the first PDU session such that the C2 communications can be sent or received via the first PDU session.

3. The WTRU of claim 1, wherein the C2 communications comprise at least a first command and control message associated with a first quality of service requirement, or a second command and control message associated with a second quality of service requirement.

4. The WTRU of claim 1, wherein being configured to initiate the second PDU session comprises being configured to indicate a temporary ID associated with the WTRU.

5. The WTRU of claim 1, wherein the initiation of the first PDU session is triggered by a command received via a side-link communication.

6. The WTRU of claim 1, wherein the authentication and authorization are performed with at least one of: a UAS Service Supplier (USS), or a UAS Traffic Management (UTM).

7. A method performed by a wireless transmit/receive unit (WTRU), the method comprising:

sending, to a network node, a first message, wherein the first message indicates a request to initiate a first protocol data unit (PDU) session associated with an authentication and authorization of the WTRU;

receiving, from the network node, a second message, wherein the second message indicates an unmanned aerial vehicle (UAV) ID;

sending, to the network node, a third message based on the authentication and authorization being successful, wherein the third message indicates a request, using the UAV ID, to initiate a second PDU session for command and control (C2) communications, and wherein the third message includes an authorization payload for the C2 communications; and receiving, from the network node, a fourth message, wherein the fourth message is a PDU session accept message.

8. The method of claim 7, further comprising modifying the first PDU session such that the C2 communications can be sent or received via the first PDU session.

9. The method of claim 7, wherein the C2 communications comprise at least a first command and control message associated with a first quality of service requirement, or a second command and control message associated with a second quality of service requirement.

10. The method of claim 7, wherein initiating the second PDU session comprises indicating a temporary ID associated with the WTRU.

11. The method of claim 7, wherein the initiation of the first PDU session is triggered by a command via a side-link communication.

12. The method of claim 7, wherein the authentication and authorization are performed with at least one of; a UAS Service Supplier (USS), or a UAS Traffic Management (UTM).

* * * * *